G. W. GOODRIDGE.
PULL SWITCH.
APPLICATION FILED DEC. 14, 1910.

984,902.

Patented Feb. 21, 1911.

Inventor
Gilbert W. Goodridge
By his Attorneys
Howson and Howson

UNITED STATES PATENT OFFICE.

GILBERT W. GOODRIDGE, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

PULL-SWITCH.

984,902.

Specification of Letters Patent.  Patented Feb. 21, 1911.

Application filed December 14, 1910. Serial No. 597,312.

*To all whom it may concern:*

Be it known that I, GILBERT W. GOODRIDGE, a citizen of the United States of America, and residing at Bridgeport, in the county of Fairfield and State of Connecticut, have invented a certain new and useful Improvement in Pull-Switches, of which the following is a specification.

My invention relates to switches and particularly to pull switches, the object of my invention being to improve the chain rail thereof in the detail hereinafter pointed out.

Figure 1:
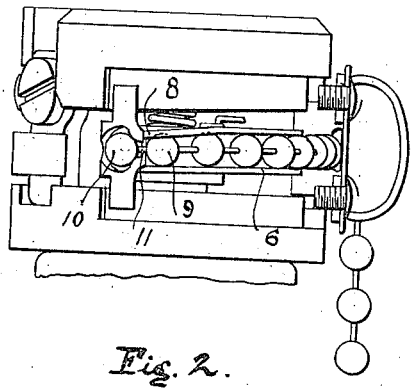
Figure 2:
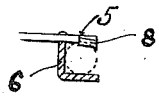
Figure 3:
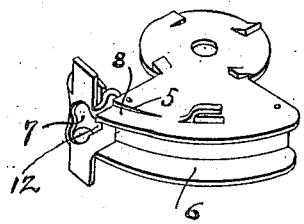

In the accompanying drawings, Figure 1 is a side elevation of a pull socket showing my invention embodied in the chain rail thereof; Fig. 2 is a cross section of the chain rail; Fig. 3 is a perspective of the rail together with the ratchet member carrying the same.

In the manufacture of balls for pull chains for switches of the character referred to, there is a variation in the size of the balls and in the lengths of the links connecting the same, which renders it difficult at times to adjust the chain in the rail. Furthermore, there is a tendency of the chain to jump in the rail and to loosen the end ball from its socket, if after a pull the chain is permitted to snap back under the influence of the ratchet spring, To avoid these difficulties, I now propose to wedge the ball or balls adjacent the end ball firmly in the rail by offsetting one side of the latter, in suitable fashion. One way of doing this is illustrated in the drawings and consists in shearing down at 5 one side of the end of the rail 6, adjacent the socket 7, and pressing the free end of the wing 8 so formed into the ball channel. Inasmuch as the metal of which the part is constructed has a certain amount of resiliency, the wing 8 forms in effect a spring member which not only keeps the second ball 9 of the chain tight in the channel, but also serves to wedge it apart from the socket ball 10 and thus keeps the link 11 in the slot 12, and the end ball tight in the socket irrespective of size. Furthermore the danger of a snap back of the chain under the influence of the ratchet spring, is much lessened since the spring wing 8 keeps the socket ball and its neighbor in position in spite of the jump of the other balls of the chain.

Other ways of accomplishing the results mentioned will readily suggest themselves and I do not limit myself to the precise structure shown.

I claim as my invention:

1. In a chain rail for pull switches, means acting on an adjacent ball to hold the end ball of the chain in its socket.

2. In a chain rail for pull sockets, spring means for holding the end ball in its socket.

3. A chain rail having one side offset adjacent the ball socket, for the purpose specified.

In testimony whereof I have signed my name to this specification, in the presence of two subscribing witnesses.

GILBERT W. GOODRIDGE.

Witnesses:
 L. B. WHEELER,
 H. M. WICHERT.